United States Patent [19]

Shin et al.

[11] Patent Number: 5,687,171
[45] Date of Patent: Nov. 11, 1997

[54] DEVICE AND METHOD FOR ALLOCATING RADIO CHANNELS IN A CDMA SYSTEM

[75] Inventors: Sung-Moon Shin; Hun Lee, both of Daejeon, Rep. of Korea

[73] Assignee: Electronics and Telecommunications Research Institute, Daejeon-shi, Rep. of Korea

[21] Appl. No.: 571,733

[22] Filed: Dec. 13, 1995

[30] Foreign Application Priority Data

May 12, 1995 [KR] Rep. of Korea ............ 95-11709

[51] Int. Cl.$^6$ ............... H04B 7/26; H04J 13/00
[52] U.S. Cl. ............... 370/335; 455/33.1; 455/54.1; 455/67.1
[58] Field of Search ............... 370/18, 85.7, 95.1, 370/95.3, 320, 329, 335, 342; 375/205; 455/33.1, 38.3, 53.1, 54.1, 54.2, 56.1, 63, 67.1; 379/59

[56] References Cited

PUBLICATIONS

CDMA Network Engineering Handbook, Draft Version X1; pp. 4-1 -4-20; Chapter 4.
Ganesh, et al.: "Traffic Capacity of Cellular Packet CDMA for Varying Cell Size and Propagation Scenarios"; pp. 805-809; IEEE Journal 1994.
Liu, et al.: "Sir-Based Call Admission Control for DS-CDMA Cellular Systems" pp. 638-644; IEEE Journal of Selected Areas in Communications, vol. 12, Nov. 4, May 1994.

Primary Examiner—Hassan Kizou
Attorney, Agent, or Firm—Larson & Taylor

[57] ABSTRACT

A device and method for allocating channels from a base station to a mobile station run with a CDMA Cellular System that includes a first step for measuring the strength of a signal received, a second step for calculating the margin allowed for signal strength by subtracting the size of a signal received, measured in the first step from the total interference allowed, a third step for evaluating whether the margin calculated in the previous step has not been exceeded upon receiving a new radio channel request from a mobile station, and a fourth step for allocating a radio channel to a requesting mobile station when the evaluation result shows that the required power is less than the margin. By utilizing the present invention to allocate a radio channel in accordance with the strength of a signal received by the receiving unit of the Base Station, the utilization of the radio resources of a CDMA System can be maximized and they can be easily used, and as a result, economic CDMA system services can be ensured.

2 Claims, 1 Drawing Sheet

DEVICE AND METHOD FOR ALLOCATING RADIO CHANNELS IN A CDMA SYSTEM

FIELD OF THE INVENTION

This invention relates to a device and method for allocating communication channels between a base station (BS) and a mobile station (MS) employing a CDMA (Code Division Multiple Access) Cellular System, and more particularly to a device and method for allocating CDMA radio channels required to expand the range of channels available for the service by adjusting CDMA system link capacity in reference to the power strength of the received signal at BS.

BACKGROUND OF THE INVENTION

Generally, the cellular system refers to a system of subdividing the entire cellular service area into certain segmented service areas and then, installing a base station for managing the cellular service in each area so as to enable mobile stations such as car phones and cellular phones to receive telecommunication services from the base station. In the mobile telecommunication system, a cell is an area covered by telecommunication services provided by one base station and a cluster is a group of the cells.

The cells can be configured with several sectors and at this time, the minimum service area can be sub-divided into sectors.

In the Cellular System, the radio communication services are provided as follows. When one party makes a call to a base station, the base station sends the telephone number of a mobile station called via its cell as a page message to the opposite party. On the other hand, when a mobile station makes a call, an opposite party is called via a base station he is registered to. By this method, the base station manages various types of radio resources required to provide the service to all the mobile stations in an area supervised by it.

Particularly, a base station of a CDMA Mobile Telecommunication System manages walsh codes for service traffic channels and forward-directed link gain (forward link power) for traffic channel in order to provide mobile telecommunication services. In a FDMA or TDMA (Time Division Multiplexing Access) System, the radio link capacity of a bandwidth is fixed whereas in a CDMA System that employs a spread spectrum communication operated as the above, the radio link capacity of a bandwidth is changed with external operating conditions. In addition, the capacity of a forward link is greater than that of a reverse link.

Accordingly, in the currently-employed radio frequency allocation system whose forward link bandwidth and reverse link bandwidth are the same, the radio link capacity of a CDMA system is determined by the reverse link.

The reverse link capacity that determines the radio link capacity of a CDMA System has a complementary relationship with respect to the service quality of the users.

That is, to improve service quality, link capacity should be reduced and conversely, the quality of telecommunication services should be lowered in order to accommodate more users.

The radio link capacity of a CDMA Cellular System that provides services having certain quality to the user is limited.

The factor that determines the link capacity is the interference caused by various types of electronic waves generated from a corresponding link assuming that the system uses the same bandwidth and offers the same quality services. In addition, the interference is affected by voice activities, background noises, and sectorization effects.

Particularly, the reverse link of the CDMA Cellular System is subjected to interference coming from other cells as well as the corresponding cell area.

Considering the interference discussed above, the Conventional CDMA Radio Channel Allocation System which utilized the fixed link capacity is inadequate for the CDMA System. It determines whether to allocate radio channels to the new users while not exceeding the corresponding link capacity. When employing this system, the actual link capacity of CDMA System can not be utilized and as a result, flexibility can not be considered beforehand. In other words, all available channels that exist on the corresponding radio link can not be utilized thus reducing the radio resource efficiency.

SUMMARY OF THE INVENTION

The objective of the present invention is to provide a device and method for allocating CDMA radio channels through the measurement of the strength of reverse link signals generated from a mobile station at a certain time interval.

The link capacity of the CDMA System according to the measurement results in the utilization of the actual link capacity, thus maximizing the availability of radio link between a base station and mobile station of the CDMA System.

In accordance with one aspect of the present invention, there is a device provided to allocate channels from a base station to a mobile station operating under a CDMA Cellular System. This comprises means for measuring the level of signal received from mobile stations via an RF processing unit, several match filter means for detecting digital signals from signals that have been modulated and processed at the RF processing unit, several channel processors that decode digital signals detected from the match filter means for each channel, and a base station control unit for controlling the channel processors through the reception of the data on the strength of signals measured at the measuring means for measuring the sizes of signals received.

In accordance with another aspect of the present invention, there is a method provided to allocate channels from a base station to a mobile station, comprising a first step for measuring the strength of signals received, a second step for calculating signal strength allowed as spare, that is obtained by subtracting the level of the received signal measured at the first step from total interference allocated by network, a third step for evaluating whether or not the limit of signal strength used as a margin, calculated at the second step exceeds the power required for a call upon receiving a radio channel assignment request made by the call, and a fourth step for allocating a radio link channel when the result of the third step shows that the required power does not exceed the limit.

BRIEF DESCRIPTION OF THE DRAWINGS

An embodiment of the present invention can now be described by way of example with reference to the accompanying drawings in which.

DETAILED DESCRIPTION OF THE INVENTION

Figure 1:
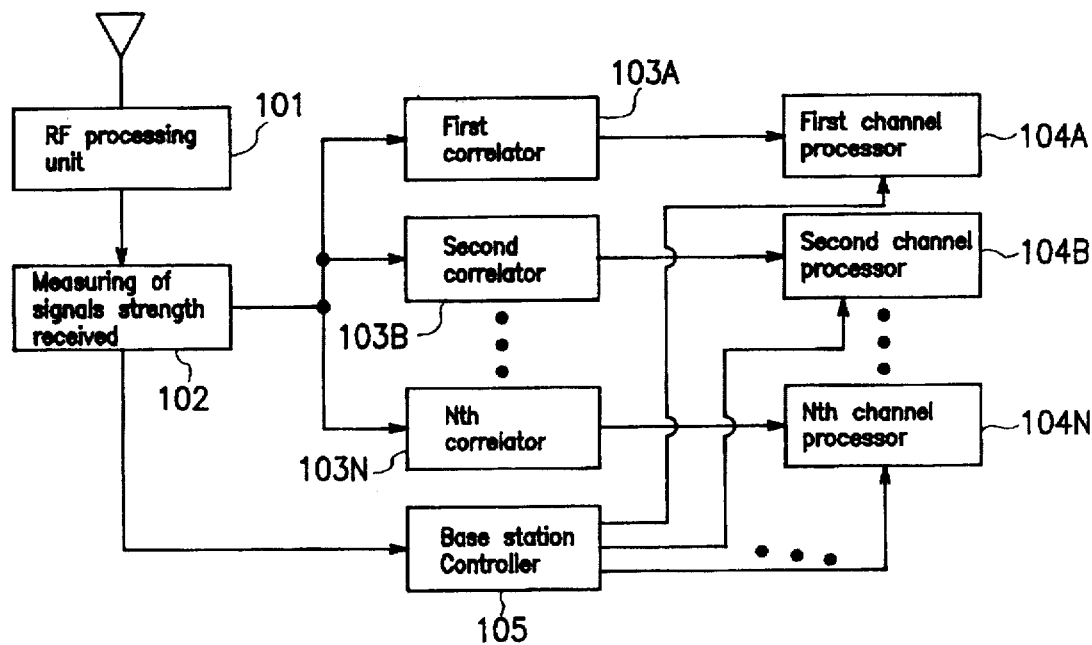
FIG. 1 is a schematic electrical block diagram of the channel allocation control unit of a base station according to the present invention.

Referring to FIG. 1, the channel allocation unit of a base station is largely made up of a RF processing unit (101) for receiving RF signals sent via a radio telecommunication network and then converting them, a unit (102) for measuring the sizes of signals received in order to determine the strength of signals received, several correlators (or match filters) for detecting digital signals from signals that have been modulated and processed at the RF processing unit (101), several channel processors (104A~N) for decoding digital signals that have been detected from the corresponding correlators (103A~N), and a base station control unit (105) for controlling the correlators (103A~N) and channel processors (104A~N) through the receiving of the data on the strength of signals measured at the measuring unit (102).

Figure 2:
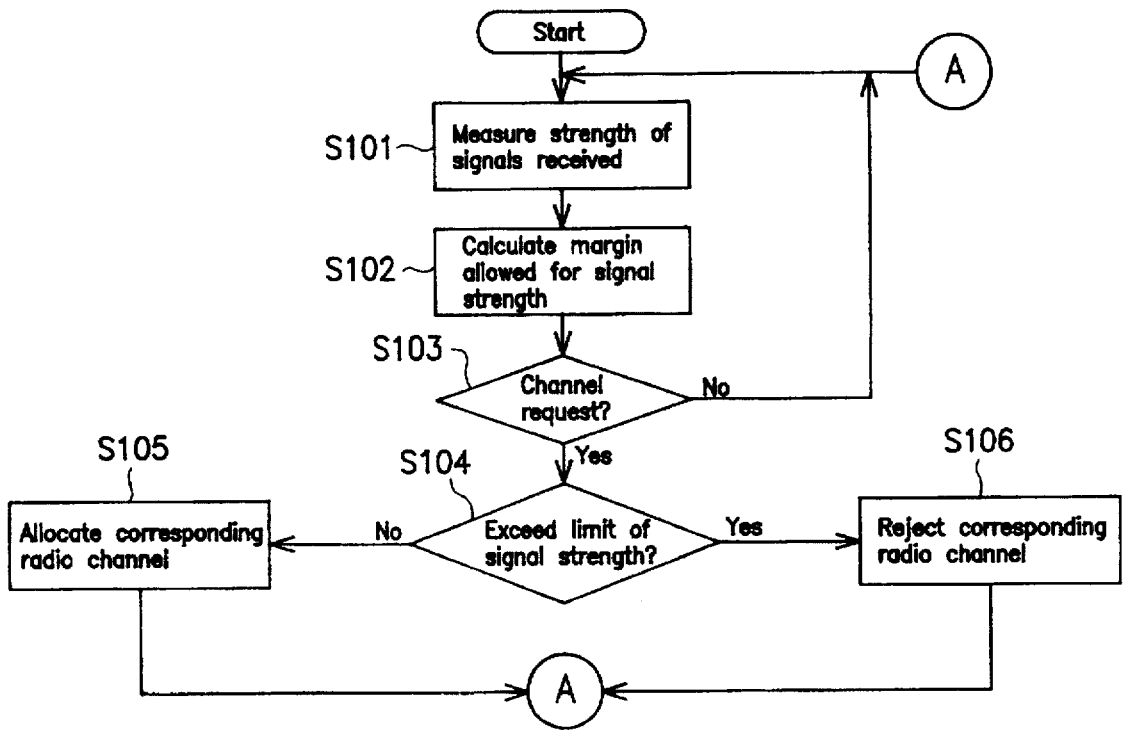
FIG. 2 is a flow chart illustrating a sequence of allocating channels of the base station control unit in FIG. 1.

Referring specifically to FIG. 2, a flow chart of a preferred embodiment of the operation of the channel allocation control unit of the present invention is illustrated.

To explain briefly about interference, one of the most important factors for determining the capacity of the radio link, it is assumed that service quality can be expressed as Eb/No and its value to be $5~7$ dB.

When assuming the above, the link capacity of the CDMA System utilizing a bandwidth of 1.2288 Mhz and the information transmission speed of a user is 9.6 Kbps (IS-95) can be calculated using the following formula:

$$N=1+[(1.2288\ MHz/9.6\ Kbps)/(5~7\ Db)]=26~23.$$

For most cases, the sizes or strengths of signals received are approximately identical to that of the interference experienced by a demodulator (or correlators), and accordingly, the signal reception resolution of the measuring unit is the absolute value of the size of a signal received by a channel.

However, a little margin must be secured for interference generated in actual practices considering the size of a signal received by a channel (usually about −73 dBm), voice activities (usually about 0.4), and measurement errors. Generally, in the case of CDMA Mobile Cellular System, it is about −83 dBm.

In the following section, the process of allocating channels at the control unit of the base station (105) is explained assuming that the system is subject to the above reception resolution.

In step S101, the control unit (105) of a base station reads the strength of a signal that has been measured and provided at an output of the unit (102) for measuring the strength of a signal received during an interval that is shorter than that requested by a call. For example, it can be about 10% of the average call arrival interval.

In step S102, the margin allowed for signal strength is calculated by subtracting the size of a received signal that has been read from the total interferences allocated by the network.

In step S103, the evaluation on whether a new radio channel has been requested is made and if not, step S101 is carried out. If the evaluation result shows that a request has been made, the operation proceeds to step S104. In step S104 an evaluation is made on whether the signal strength required for allocating radio channels according to the channel request made in step S103 exceeds the limit of the margin calculated in step S102.

When the evaluation result shows that the margin is more than the required power strength in step S104, corresponding channel processors among channel processors (104A~N) should be controlled in order to allocate a radio channel, while carrying out step S105. If the evaluation result shows that the margin is less than the required power strength in step S104, the allocation request of a corresponding radio channel is rejected in step S106.

As has been described, when allocating radio channels in accordance with the strength of a signal received by the receiving unit of the base station of the CDMA System through the utilization of the present invention, the utilization of the radio resources of the CDMA System can be maximized and as a result, economic CDMA system services can be ensured.

What is claimed is:

1. A method for allocating channels from a base station to a mobile station run with a CDMA Cellular System, comprising:

a first step for measuring the strength of a signal received;

a second step for calculating the margin allowed for signal strength by subtracting the size of a received signal measured in said first step from total interference allowed;

a third step for evaluating whether the margin allowed for signal strength, calculated in step 2 exceeds the power required for a call; and a forth step for allocating a radio channel when the evaluation result shows that the margin is more than the required power.

2. A device for allocating channels from a base station to a mobile station operating under a CDMA Cellular System, comprising:

a received signal strength measuring means for receiving signals sent from a mobile station via an RF processing unit and for measuring the strength of a received signal;

several match filter means for detecting digital signals from signals that have been modulated and processed in said RF processing unit;

several channel processors, each processor for a corresponding channel, for demodulating the digital signals that have been detected in a corresponding match filter means; and a control unit of a base station that controls said channel processors after receiving the data on the strength of a signal measured at said measuring means.

* * * * *